(12) United States Patent
Carew (10) Patent No.: US 11,008,241 B2
(45) Date of Patent: *May 18, 2021

(54) APPARATUS AND METHOD TO CONCENTRATE AND DRY GENERALLY ORGANIC SOLIDS AND PRODUCE PURIFIED WATER THEREFROM

(71) Applicant: E. Bayne Carew, Naples, FL (US)

(72) Inventor: E. Bayne Carew, Naples, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/598,682

(22) Filed: Oct. 10, 2019

(65) Prior Publication Data

US 2020/0207654 A1 Jul. 2, 2020

Related U.S. Application Data

(63) Continuation-in-part of application No. 16/548,457, filed on Aug. 22, 2019, now Pat. No. 10,583,396.

(60) Provisional application No. 62/798,723, filed on Jan. 30, 2019, provisional application No. 62/793,043, filed on Jan. 16, 2019, provisional application No. 62/785,405, filed on Dec. 27, 2018.

(51) Int. Cl.
*C02F 11/122* (2019.01)
*C02F 11/143* (2019.01)
*C02F 1/44* (2006.01)
*C02F 11/127* (2019.01)
*C02F 11/125* (2019.01)

(52) U.S. Cl.
CPC ............ *C02F 11/122* (2013.01); *C02F 1/44* (2013.01); *C02F 11/125* (2013.01); *C02F 11/127* (2013.01); *C02F 11/143* (2019.01); *C02F 2303/04* (2013.01); *C02F 2303/16* (2013.01)

(58) Field of Classification Search
CPC ..... C02F 11/122; C02F 11/125; C02F 11/143; C02F 1/44; C02F 11/127
See application file for complete search history.

(56) References Cited

U.S. PATENT DOCUMENTS

| | | | |
|---|---|---|---|
| 3,977,797 A | * | 8/1976 | Paterson ............... B05C 17/002 401/15 |
| 6,761,270 B2 | | 7/2004 | Carew |
| 7,122,123 B2 | | 10/2006 | Carew |
| 7,513,372 B2 | | 4/2009 | Carew |

(Continued)

*Primary Examiner* — Krishnan S Menon
(74) *Attorney, Agent, or Firm* — Gregory D. DeGrazia; Miller, Canfield, Paddock & Stone PLC (57) ABSTRACT

A filter assembly separating organic waste from water includes a first annular filter element defining an axis. The first annular filter element is defined by a first annular coil of flat wire and an optional second filter element is defined by a second annular coil of flat wire, being generally helical in the axial direction. A cylindrically or frustoconical filter membrane is concentrically disposed between the first and second annular filter element. The filter membrane is porous having aperture size of less than a nano-particulate size of the organic waste, but greater than a nano-particulate size of the water molecule. The second annular filter includes adjustable porosity for selectively preventing particles from reaching the filter membrane and selectively cleaning the membrane by reversed flow of water through the membrane. The assembly generates radial and distal flows and differential pressure forces, for use in high throughput industrial, agricultural and municipal facilities.

9 Claims, 7 Drawing Sheets

(56) References Cited

U.S. PATENT DOCUMENTS

| | | |
|---|---|---|
| 7,674,377 B2 | 3/2010 | Carew |
| 7,993,519 B2 | 8/2011 | Carew |
| 8,147,590 B2 | 4/2012 | Carew |
| 8,262,753 B2 | 9/2012 | Carew |
| 8,329,037 B2 | 12/2012 | Carew |
| 8,632,678 B2 | 1/2014 | Carew |
| 8,636,835 B2 | 1/2014 | Carew |
| 9,131,667 B2 | 9/2015 | Carew |
| 9,269,976 B2 | 3/2016 | Carew |
| 2010/0084324 A1* | 4/2010 | Geisbauer ............... B01D 29/23 210/110 |
| 2015/0182879 A1* | 7/2015 | Boerger ............. B01D 29/6476 210/770 |

* cited by examiner

APPARATUS AND METHOD TO CONCENTRATE AND DRY GENERALLY ORGANIC SOLIDS AND PRODUCE PURIFIED WATER THEREFROM

PRIOR APPLICATIONS

The present application claims priority as a Continuation-in Part application to U.S. patent application Ser. No. 16/548,457 filed on Aug. 22, 2019 that claims priority to U.S. Provisional Patent Application No. 62/785,405 filed on Dec. 27, 2018 and to U.S. Provisional Patent Application No. 62/793,043 filed on Jan. 16, 2019 and to U.S. Provisional Patent Application No. 62/798,723 filed on Jan. 30, 2019, the contents each of which are incorporated herein by reference.

TECHNICAL FIELD

The present invention relates generally toward a continuous filtration system for separating drying organic waste and brackish waste. More specifically, the present invention relates to an apparatus and filtration system for drying organic waste while producing purified water from the waste.

BACKGROUND

Industrial farming has become increasingly prevalent as a means to economically produce proteins to meet the dietary needs of the populous. For example, large farming enterprises now produce, for example, chicken eggs and poultry, or hog farming for producing pork products. Further, cattle have been raised in large scale farming operations to produce milk and beef economically. Unfortunately, industrial farming has caused significant environmental contamination due to the fecal and other waste produced by the animals. Organic runoff is known to contaminate fields, streams, and ground water as may be periodic flood waters. In addition, medicine used to treat the animals has also been found in the environment at level believed to be unsafe to humans. To date, there has not been a solution to this organic contamination that is both economical and environmentally friendly. The high solids content of the organic waste has rendered attempts at filtration impractical. While drying has been attempted, high water content remains in the organic waste along with objectionable odors and unacceptable levels of objectionable bacteria. Solid human waste in the amount of about half a trillion tons per year is also problematic for similar reasons as is evident with organic waste from industrial farms. In addition, the water removed during drying processes remains unusable and still caused undesirable contamination to the environment.

Landfill costs, tipping fees and on site air quality are all factors that add to the problems associated with handling organic waste. If it were even feasible with current technology to sterilize, deodorize and dry organic waste the cost to do so would be unfeasible. However, should it become feasible to achieve these benefits, pyrolytic disposal also becomes possible providing the benefit of eliminating acidic or caustic leachate caused from organic waste from landfills.

Therefore, there Exists a Need for an Improved Method of Concentrating, then Dewatering Generally Organic Waste, that is Economically Feasible, Providing Clean, Useable Water as Byproduct

SUMMARY

A method of separating solid organic waste from a stream of organic sludge is disclosed. A dewatering assembly includes a first annular filter element that is defined by a first annular coil of a flat wire. The flat wire is generally helical in an axial direction defined by the coil. The first annular filter element defines a sludge side that is disposed radially inwardly of the first annular coil and a filtrate side that is disposed radially outwardly of the first annular coil. A compression of the first annular coil defines filtration spacing between adjacent coils of the annular coil. Organic sludge is delivered to the sludge side of the first annular filter element. Filtrate is conveyed radially outwardly through the first annular coil while simultaneously compressing the organic matter in the axial direction thereby reducing water content of the organic sludge. An oxidizing agent is introduced to the sludge being delivered to the sludge side of the first annular filter element thereby oxidizing the organic matter for separating the organic matter from said filtrate.

Optionally, the use of membranes consisting of nano-porous media such as zeolite, graphene and thin films of selective adsorbent, hereinafter zeolite, can be included to produce clean water from the organic waste. This process has been particularly difficult with respect to recovering any clean or purified water from organic waste. Zeolites, which include numerous distinct topologies, provide water permeability and particulate exclusion by way of ion entrapment and/or exclusion, while providing threefold increase in water permeability over polyamide based reverse osmosis membranes, which are not considered for use in filtration of organic matter. The use of a carrier filter provides support, enables self-cleaning and protection of an ultra-thin zeolite nano-porous membrane layer, given that the carrier filter is micro-porous. In addition, the carrier filter is designed to provide enough support to the zeolite membrane layer to allow for negative pressure on a permeate side and positive pressure on an inlet side of the filter pores for enhanced water or water velocity and improved organic waste or particulate exclusion and filtration.

Zeolite membranes, and the like used in this invention and present application include porosities of about 0.6 nanometers, which are sufficient to exclude hydrated metal or organic ions while also allowing penetration of water that includes a molecular size of about 0.27 nanometers. It will be correspondingly understood that porosity differences, which allow permeates to transport across the membrane, exclusive of retentate, may be selected for other applications. These may include bio- and industrial waste and toxins, where differences in molecular cross section and membrane aperture may be chosen to discriminate between retentate and permeate as noted above. As set forth in more detail below, the unique concentric filtration and backflush operations overcome organic accumulation that evades the first annular filter element and known to block pores defined by the zeolite molecular structure. In one embodiment, octahedral zeolite or graphene structures have proven beneficial for necessary exclusion without preventing flow of water through the filter membrane. It will be understood further by illustration that these two medias may be used together or in combination with selective adsorbents. The filtration assembly of the present invention also provides for desirable levels of dewatering. This level of organic extraction may also include newly recognized toxins such as polyfluoroalkyl substances (PFAS) and other biohazards from the filtrated water. In this latter application example, a this film of adsorbent media such as polycalcium phosphate with affinities in the parts per trillion, placed adjacent the size selecting membrane, will entrap the trace but toxic agent, while enabling transport of water and such innocuous fluids. The membrane may be thus used to cut the fluid into innocuous and nocuous components.

In particular, the invention of the present application is automated and self-cleaning while providing the benefit of both dewatering and deodorizing both municipal and industrial organic waste sludge. The dewatering assembly provides for adjustable filtration apertures and includes screw conveyor type fins that are interconnected to a porous rotating shaft into which compressed dry air may also be delivered. The dry air may also be augmented with oxidizing agents that deodorize, sterilize and dehydrate the organic sludge. The oxidizing agents are selected to assist stripping bound water from the organic matter.

In one embodiment, heat and augmented flues enter the inlet waste stream uniformly radially from a center outward having a travel radius of three inches for outputs approximately seven pounds per minute, which optimally includes the conveyor shaft rotating at about thirty rotations per minute with partially dried solids and enhanced speeds when processing watery suspensions. If this were a conventional dewatering assembly, the water extraction rate would depend on longitudinal diffusion (as with settling ponds) with media resistance determining the water extraction rate. In radial (internal) entry employed herein, the water filtrate is instantly mobile, passing into the filtrate side, subject (as in flash processing) to both vacuum externally to the filtrate side of the dewatering assembly and pressure internally to the sludge side of the dewatering assembly. Should the filtration media become blocked with fine and adhesive solids, there is programmed a self-cleaning backwash, where the backwash may utilize product water and/or waters or steam as may be necessary that will be described further herein below.

One oxidizing agent contemplated by the inventor is ozone, which will oxidize sulfides and amines entrapped in the organic matter rendering their organic aromatics odorless while breaking the weak hydration bonds. However, other oxidizing agents, acids or alkalis that may be more suitable for different organic wastes are also within the scope of this invention.

The organic waste feed time and backwash cycle are regulated by a central processing unit (CPU) that is programmed to optimize filtration rates and backwash cycle intervals. The CPU operates the relays, pumps, valves and any other electronically controlled accessories. The CPU includes external digital controls to manage the heat extraction, when necessary, and to process corresponding backwash media loading rate. It should also be understood by those of ordinary skill in that that enclosing housing of the dewatering assembly and the dewatering assembly itself is not restricted to cylindrical or conical shapes, but generally include solids transports of different, but hollow configurations. It should be apparent from the various Figures that the aperture open and close mechanism are also enabled by a compressive piston to force the freed water radially out the enclosing filter into a surrounding trough or filtrate chamber, which includes optional emptying under partial vacuum.

BRIEF DESCRIPTION OF THE FIGURES

Other Advantages of the Present Invention Will be Readily Appreciated, as the Same Becomes Better Understood by Reference to the Following Detailed Description when Considered in Connection with the Accompanying Drawings, Wherein.

DETAILED DESCRIPTION

Figure 1:
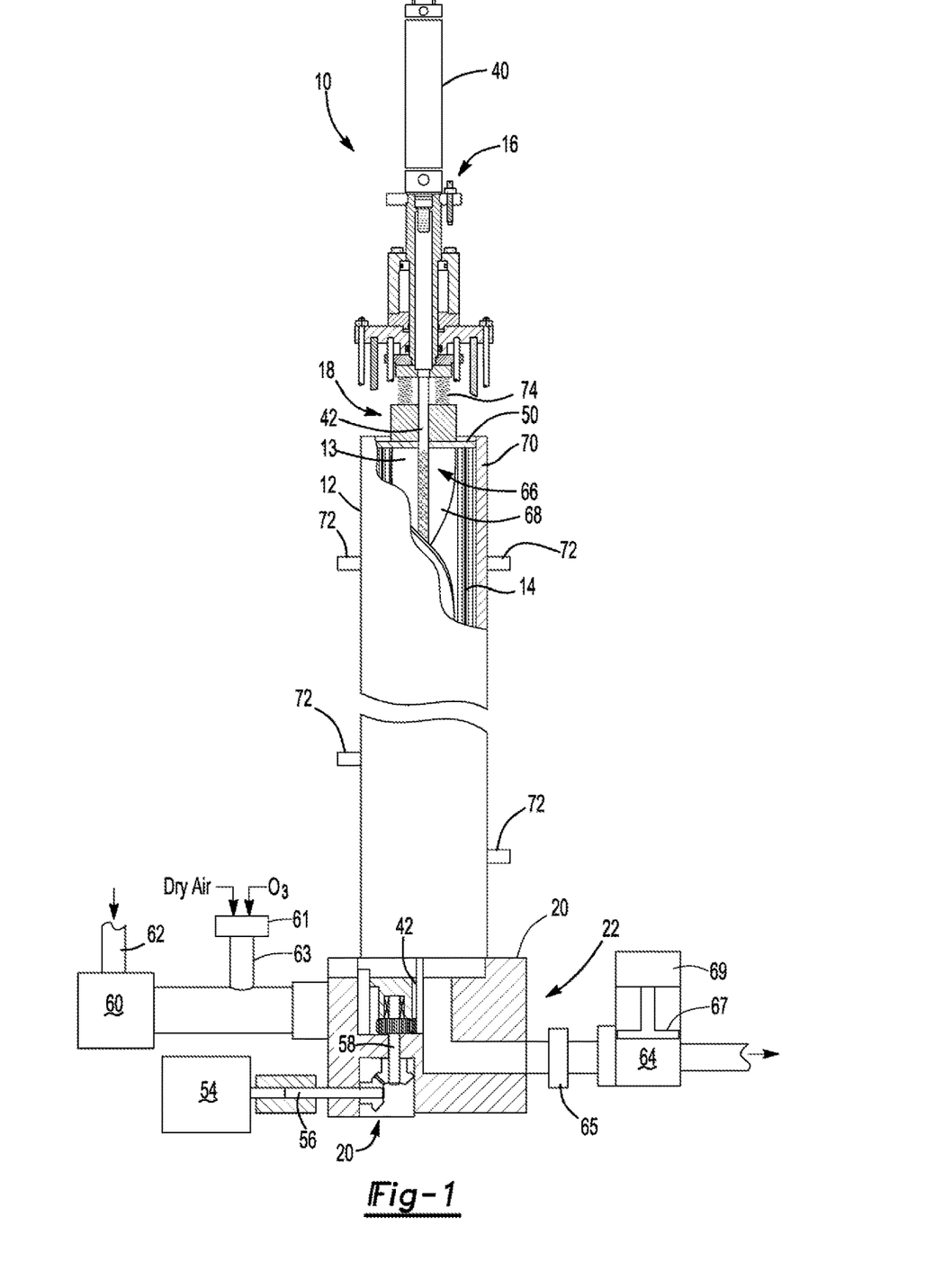
FIG. 1 shows a side schematic view of the filter assembly of the present invention.

Referring to FIG. 1, a side view of one embodiment of a filter assembly of the present invention is generally shown at 10. A housing 12 encloses a variable aperture filter apparatus 14, the function of which will become more evident herein below. An aperture drive mechanism 16 is disposed upon a first end 18 of the filter assembly 10 and an organic waste/water control assembly 20 is disposed upon a second end 22 of the filter assembly 10.

Figure 2:
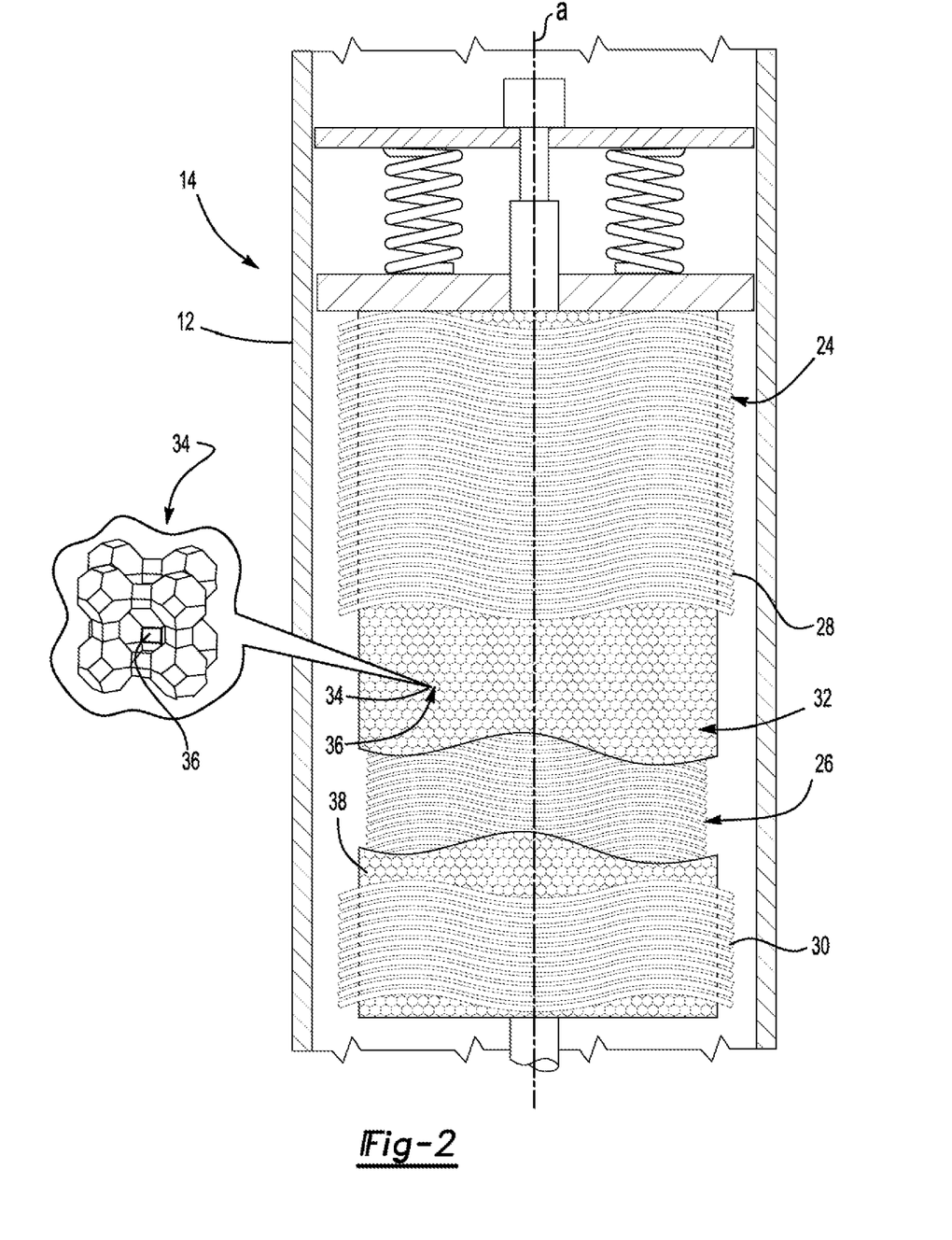
FIG. 2 shows a partial view of the first and second annular filter elements concentrically enclosing the filter membrane.

Referring now to FIG. 2, wherein a schematic of the filter apparatus 14 is shown including a first annular filter element 24 and a second annular filter element 26 that defines an inner housing chamber 13 (FIG. 1). In one embodiment, only the first annular filter element 24 is implemented. However, the second annular filter element 26 is included to provide additional filtration, and even water purification at a molecular level when included with additional filtration media as will be explained further herein below. The first annular filter element 24 is disposed radially outwardly of the second annular filter element 26, when included. The first annular filter element 24 is formed from a first annular coil 28 of flat wire being generally helical in an axial direction and the second annular filter element is formed from a second annular coil 30 of flat wire that is also generally helical in the axial direction. Because the second annular filter element 26 is received concentrically inwardly of the first annular filter element 24, a diameter of the second annular filter element 26 is less than a diameter of the first annular filter element 24. The configuration of the first annular filter element 24 and the second annular filter element 26 are both substantially the same as the wave coil disclosed in U.S. Pat. No. 6,761,270 WAVE COIL FILTER ASSEMBLY, and U.S. Pat. No. 7,122,123 METHOD OF FILTERING A FLUID WITH A FILTER ASSEMBLY the contents both of which are included herein by reference. Therefore, it should be understood by those of skill in the art that a size of apertures disposed between sequential coils (porosity) of the flat wire are adjustable by way of adjusting compression on the annular filter elements, the purpose of which will be described further herein below.

Each of the first annular coil 28 and the second annular coil 30 are formed from a single helical coil of flat wire stock providing adjacent coil gaps of between 2 microns and 20 microns when closed for filtration and about 250 microns when open for backwash and cleaning. Crimped spring steel from sources such as, for example IndiaMART and Smalley Steel suffice depending on price point. In one embodiment, Smalley Steel may provide 12 three inch height stacked segments by ten to twelve inch diameter segments. Segmented assembly may be of particular use due to the formation of a filter membrane 32 that is embedded between the first annular filter element 24 and the second annular filter element 26. Such annular wave spring segments may be capped with flat retainer rings or shims, such that the first and second filter elements may be more readily assembled with the enclosed zeolite and/or graphene membranes as subunits units of the 12 noted in this embodiment. So also the similarly conical or frustoconical alternative illustrated in FIG. 7, where radial and tangential gravitational forces are enabled.

Figure 5:
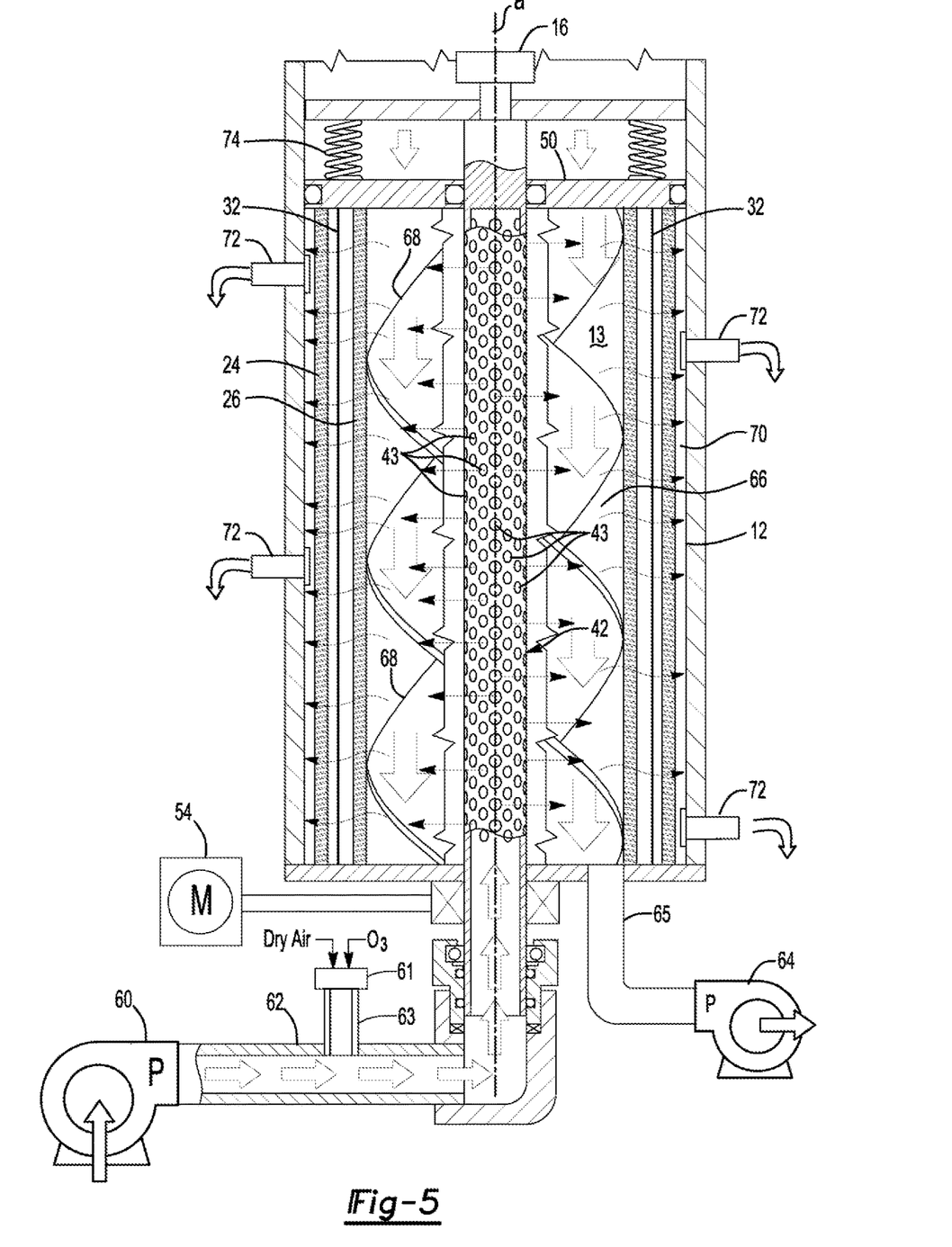
FIG. 5 shows a schematic view of the assembly of the present invention with waste filtration flow direction.

In another embodiment of the Inventor's disclosed wave coil, as in the United States Patents referenced above, the nano-apertures may be generated between the coil's opposed flat surfaces. When the wave coils' apertures are reduced to zero by compression, the flat opposing surfaces may be pre-formed to contain laser etched nano-pore grooves. These would have widths at least 0.050 microns and densities of 100 grooves per millimeter, radially disposed on the surfaces of the filters' flat wire. The purpose of such mesoporous grooved surface in the first 24 annular elements is to channel fine bacterial, algal and humic slimes as may penetrate the incompletely closed apertures of this spiral wave filter 24. Adapting to saline or brackish or bio-waste fluids can be challenging, given that such complex fluids may require filtration layering. Under high pressures the disorganized slimes will aggregate or condense into molecular level sheets, external to the membrane enclosed between the first 24 and second 26 filter elements. Physical chemistry confirms the formation of such condensed sheets, which will flow parallel to the membrane 32; during backwash, these sheets are broken up into fibrils, passing in reverse direction back through the mesoporous containing filter 24 into the discharge wash (FIG. 5, 65).

Figure 7:
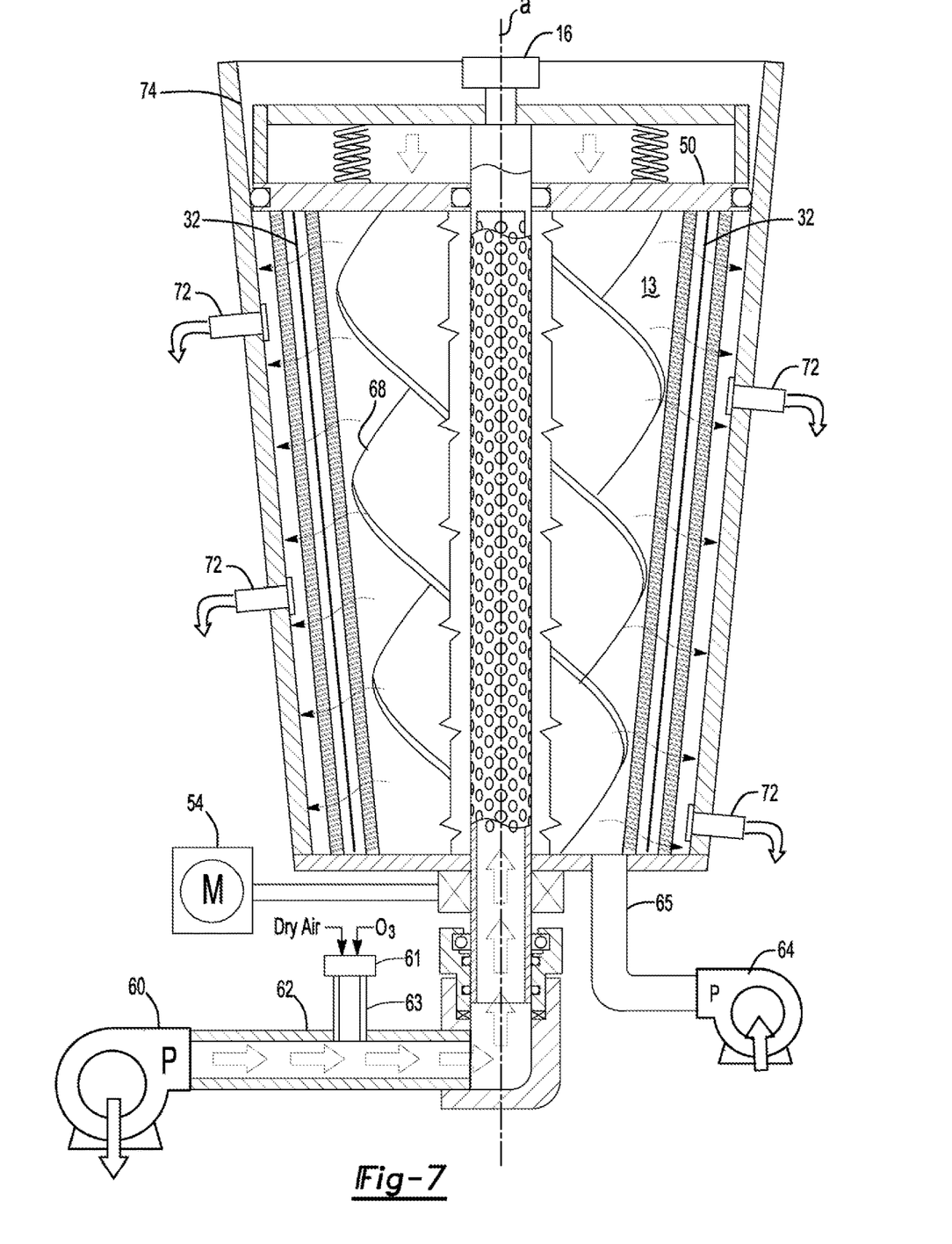
FIG. 7 shows an alternative conical shaped assembly and dewatering assembly.

The filter membrane 32 includes a tubular shape, or alternatively a frustoconical shape as is represented in FIG. 7, and is disposed between the first annular filter element 24 and the second annular filter element 26 so that the first annular filter element is disposed radially outwardly of the filter membrane 32 and the second annular filter element 30 is disposed radially inwardly of the filter membrane 32 presenting concentric alignment in the axial direction so that a common axis is defined. The filter membrane 32 is formed to define molecular sized membrane pores 36 for entrapping organic waste while allowing water in which the organic waste is entrapped to pass through. In one embodiment, the filter membrane 32 is formed from zeolite 34, which is deposited on a carrier membrane 38. The zeolite includes zeolite pores 36 having porosities generally less than 5 nanometers are formed in a slurry, where such media is laser 3D printed on the surface of the carrier filter as membrane 32 on the surface of carrier membrane 38. The carrier membrane 36 in some applications has a thickness in the order of 0.1 to 0.5 microns, where the membrane's 36 maximum thickness ideally will be kept to no greater than 0.05 microns. At such thicknesses, the zeolite slurry is 3D printed and laser sintered circumferentially and radially to form the filter membrane 32. When enclosed within the first 24 and second filter 26 elements the formed membrane, will resist differential fluid pressures external to the membrane and vacuum externally during filtration. The membrane 32, thus supported between the first annular filter element 24 and the second annular filter element 26 enables maximum water transport with sufficient stability, even as a monolayer. It should be understood that dewatering or drying the organic materials is achievable as described with or without the membrane. However, with the membrane to achieve both solid slurry (~95% water or fluid) drying and water purification, the pressure differential across the membrane is believed to be of 4 or 5 orders of magnitude difference. To achieve minimal sludge (~65% water) drying to a lesser weight percentage, the membrane and high differential pressures may be omitted for lower fabrication purposes. It should therefore be understood that the assembly 10 may be configure in a plurality of different combinations, including, but not limited to serial combinations, to meet specific needs of a particular purpose.

Figure 3:
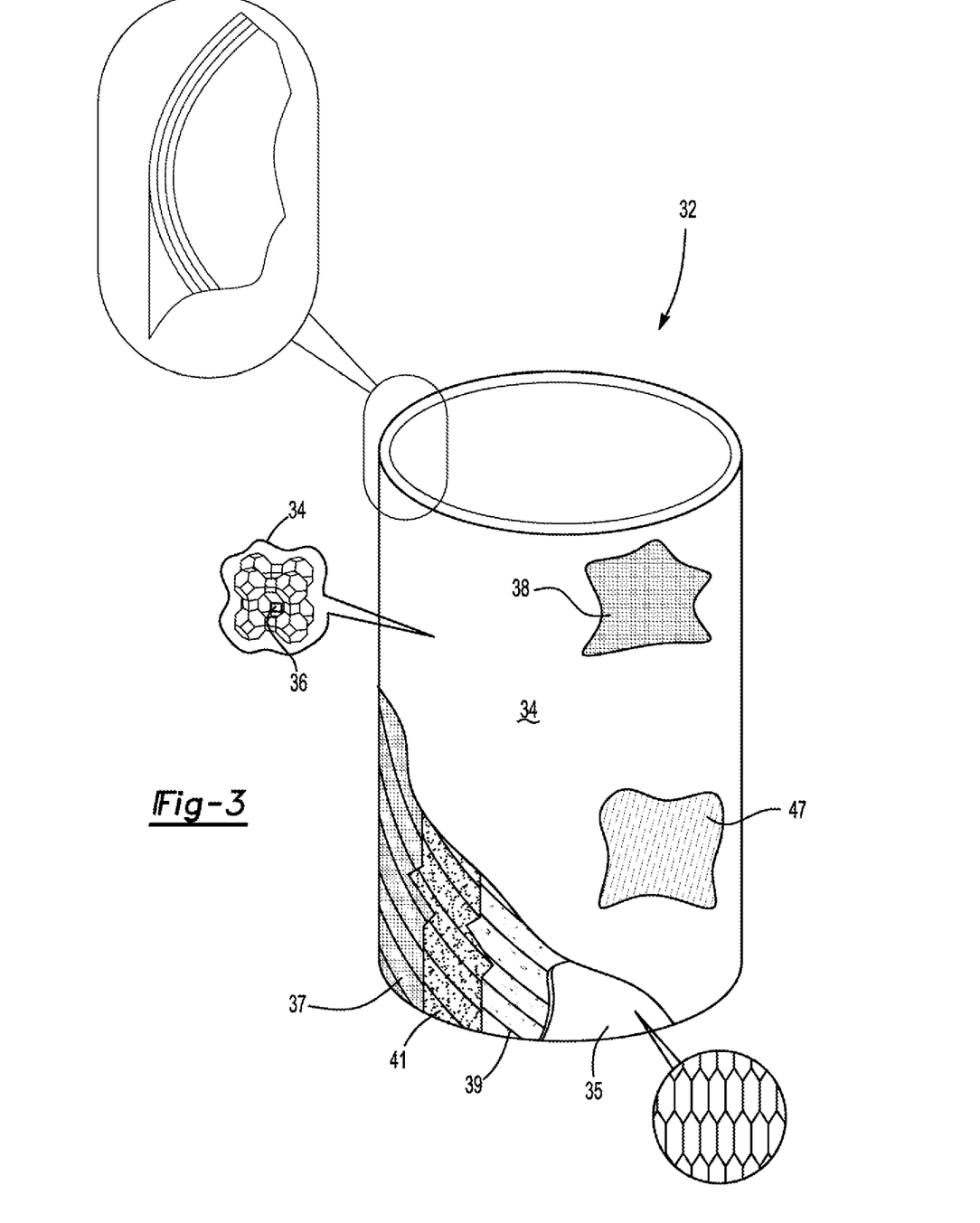
FIG. 3 shows a partial cut out perspective view of the filter membrane of the present invention including alternative embodiments.

In another embodiment, and as best seen in FIG. 3, the carrier membrane 38 may also be cladded with a graphene membrane 39, shown as oxidized or reduced octagonal sheets or strips of carbon. This is often illustrated as a microporous substrate roll or ribbon 37, e.g., copper foil 35 (bottom, dark layer), upon which to vapor deposit graphene 39 (middle layer) and coated with a porous plastic 41 (top layer). In another similar format, the tri-layer tape or ribbon 37 includes two ribbons overlying a carrier cylinder, as the carrier filter 26 equivalent.

Massachusetts Institute of Technology has recently perfected means to commercially generate ribbons or rolls of this nano-porous graphene. That octahedral graphene structure, as illustrated at 37 of FIG. 3, is thus commercially available using furnace and such devices, described as bundled in a tri-sheet roll, as represented in FIG. 3 at in 37 and 39. The ribbon 37 may also be laid over an outer surface of the second annular filter element 26 to form and define the filter membrane 32. Therefore, the filter membrane 32 is adhered to the second annular filter element 26 while still being disposed between the first annular filter element 26 and the second annular filter element 24. In this embodiment, the fabrication copper foil support 35 would be removed and the filter membrane 32 is defined by either the porous plastic 41 or the zeolite/graphene hybrid 39 or both, depending on molecular sieve requirements. This arrangement provides unique mechanical support to the membrane 32. Further, this arrangement provides differential and sequential separation of solubles from fluids when molecular size and weight vary. It should be understood that the membrane 32 porosities may be synthesized with different affinities and porosities, thus providing multicomponent separation.

By comparison, the zeolite 34 provides synthetic porosities, generally on the order of 0.5 nanometers, which, as a slurry, can be 3D printed and laser fused in a single sheet or single thin film sheet on the surface of the carrier membrane 38. In addition to zeolite 34 and graphene 39, there are other hybrid combinations as in 40, 41, where zeolite 3D laser printing may be needed 41 to bind together ribbons or sheets of graphene to form larger surface areas, depending on the water throughput required. Zeolite and graphene can be selected for comparable porosities and surface chemistries. Both zeolite and graphene media transport similarly through micro-channels networking between surface porosities. Other membrane-filter media are within the scope of this invention including acrylamide, organometallic molecular sieve agents, equivalents, and combinations as may be or become available. The space interior to the two annular filters 28 and 30 may not only include membranes formed from zeolite 34 and graphene 39 and the like, but also be packed with, for example, bone char. The contemplated compound is poly-calcium phosphate, which has a strong affinity for a recently recognized toxin, polyfluoroalkyl chemicals, where the affinity constants are reportedly in the $10^{-32}$ range, as in lower parts per trillion. Federal EPA standards are to require natural waters not to exceed 70 parts per trillion, with some States setting the limit as low as 6 ppt, making these alternative affinity embodiments particularly attractive. In order to sequester these trace quantities, a layered combination of the nano-porous membranes described above and agents, such as hydroxyapatite 42, would be required to isolate quantities for analysis and remediation. Transport rate of water, i.e. water across the filter membrane 32 is believed to be inversely proportional to membrane thicknesses and porosity of the graphene, zeolite and adsorbent constituents. Spray or dipping application of zeolite 34 slurry onto the carrier membrane 38 will form a film having an estimated 5 nanometers in thickness, preferably 0.5 as a monolayer. The 5 nanometer thickness is sufficient for desirable filtration rates, being orders of magnitude better than reverse osmosis membranes. As set forth above, desirable porosity ranges for the zeolite 34 and/or graphene 40 should be between about 0.3 and 0.5 for optimal throughput.

In order to maintain membrane integrity under pressure and at optimal thickness, it is essential that both inner and outer annular filter elements 24, 26 leave as little spacing as possible to tightly contain the membrane 32 or bulk adsorbents 34, 39, 42 to withstand rigorous filtration pressures. It is understood that the filter membrane 32 is also supported by its location between the first annular filter element 24 and the second annular filter element 26. While the Figures show radial or concentric space between the first annular filter element 24, the filter membrane 32 and the second annular filter element 26, the radial spacing is only on an order of microns enabling the annular filter elements 24, 26 to properly support the filter membrane 32 during both water filtration and cleaning cycles by way of backwashing. During assembly, the first annular filter element 24 is twisted counter clockwise, or in reverse of the direction of the first annular coil 28 to increase the inner diameter of the first annular filter element 24 by several microns. The increased inner diameter of the first annular filter element 24 provides the space to insert both the filter membrane 32 and the second annular filter element 26, disposed internally of the first filter element 24. After insertion, the reverse twist of the first annular coil 28 is released providing a singular ionic reactor element formed from the first annular filter element 24, the filter membrane 32 and the second annular filter element 26. As noted earlier, should the three element filter-membrane include one exterior laser etched element for select environmental purposes, amorphous slime may be separately isolated with the organic waste.

By way of operational example, a filter membrane 32 having a radius of about five inches and an axial length of about 36 inches provides a throughput increase of about twenty five fold over a multilayer membrane of the type used in a reverse osmosis system. Such filtration enhancements are achieved by applying thin films to the annular coils 28, 30 as will be explained further herein below.

Zeolites slurries with binding agents have been developed to form the filtration membrane 38. As noted above, such slurries may also be used to provide a thin coating to the inner side of the second annular filter element 26, with multilayered thicknesses between 5 and 10 nanometers, but preferably 0.5 nanometers as monomolecular film. The second annular filter element 26, protects the filter membrane 32 from being blocked by sediment and is self-cleaning by way of backwash to clear filter membrane 32 of any accumulated sediment and provides the means to insure continuous operation. Desalinating zeolite membrane structures was anticipated recently by Sayed H. Jamali, et al., j. Physical Chemistry, 2017 and Z. In Cao, et al., Science Advances, 2018, in this publication describes nano-sheets prepared by a dip method on macro-porous alumina substrate, with a laminated thickness of from 100 to 500 nanometers, where the permeability to water and salt rejection varies inversely with thickness, and pressure difference across the membrane. The optimal thickness and support structures described herein are made possible by the unique properties of the spiral filtration elements. These elements, together with other adsorptive and/or laser etched spiral annular components, provide options as may be needed for management of waste fluids.

Figure 4:
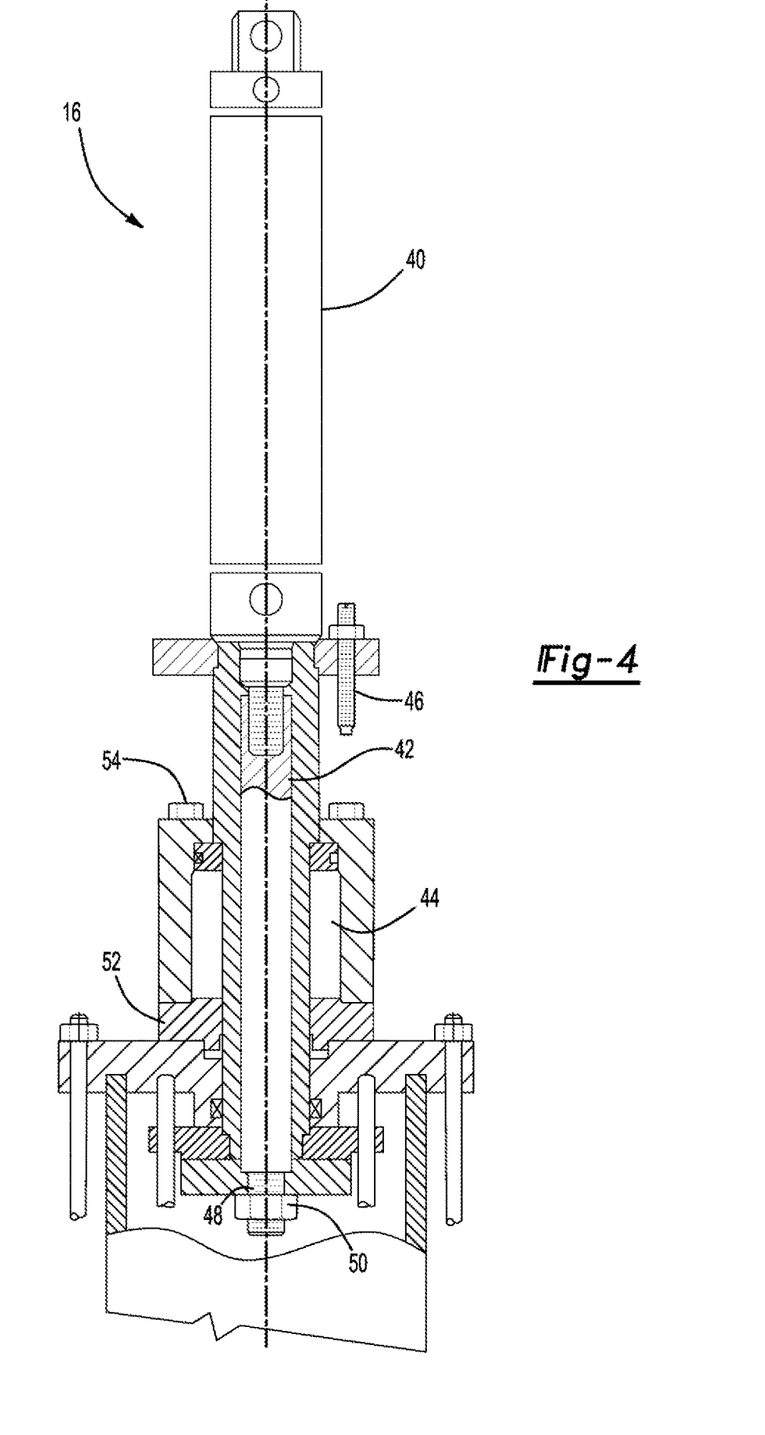
FIG. 4 shows a side view of a drive mechanism used for adjusting porosity of first and second annular filter elements.

As set forth above, the first annular filter element 24 and the second annular filter element 26 provides variable porosity by way of the aperture drive mechanism 16 best seen in FIGS. 1 and 4. The drive mechanism 16 includes a motor 40 for providing torque to an aperture drive shaft 42. In one embodiment the motor 40 is pneumatic, multi-vane or air driven by pressurized fluid or air. In another embodiment, the motor 40 is an electrically driven servomotor. With respect to the pneumatically driven motor 40, a high gear reduction on the order of 44:1 provides optimal toque. A thru-hole cylinder 44 interacts with adjustable stops 46 to provide microfiltration levels to the first annular coil 28 and the second annular coil 30 of about 20 microns during a filtering stage and about 100 microns during a backwash stage. In one embodiment an acme screw 48 extends at the end of the annular drive shaft 42 and receives a piston 50, which is retained by an acme nut 50, or equivalent. The motor 40 actuates the piston 50 for translating adjustment of the porosity of the annular coils 28, 30. In addition, the thru-hole cylinder 44 provides a drive shaft seal 52 and a quick release screw 54 for easily removing the aperture drive mechanism 16 from the housing 12.

Referring again to FIG. 1, the control assembly 20 is located at the second end 22 of the housing 12. A drive element 54 provides rotary movement to a first drive gear 56. The drive element 54 is either a servomotor, a pneumatic motor, or equivalents capable of providing rotary movement to the first drive gear 56. The first drive gear 56 transfers rotary movement to a second drive gear 58. The second drive gear 58 in turn provides rotation to the annular drive shaft 42. A fluid pump 60 delivers fluid with organic waste to the annular drive shaft 42 that is received through an organic waste inlet 62. The oxidizing agent, in this embodiment, Ozone, is injected into the organic waste through oxidizing inlet 63. The organic waste exits the annular drive shaft 42 through shaft apertures 43. The organic waste pump 60, in one embodiment is a two way pump capable of providing backpressure on the annular drive shaft 42 by reversing pumping direction. Further, pressurized air, heated dry air, or other auxiliary chemicals and agents, including waters, steam and solubilizing compositions may be delivered through the annular drive shaft to the inner housing chamber 13 by way of shaft apertures 43. However, the organic waste may also be pumped directly into the inner housing chamber 13 by the organic waste pump 60 and not through the annular drive shaft 42. Alternative organic waste pump configurations are within the scope of this invention including a combination of two pumps and cooperative valves used to reverse the flow of the organic waste from the housing 12. The control assembly 20 also includes an dried organic waste extractor 64 for removing dried organic waste from the housing 12 under pressure. A gate valve 65 provides optional selective extraction of the dried organic waste through the organic waste extractor 64 on predetermined intervals. Referring again to FIG. 1, the dried waste extractor 64 may take the form of a piston 67 driven by a servo or pneumatic motor 69. It should be understood that the dried organic waste includes a high viscosity and the type of waste extractor is selected to correspond to the level of drying the organic waste is subject to.

Therefore, the dried organic waste is likely a viscous sludge requiring a high amount of extraction pressure. Therefore, the dried organic waste extractor 64, in one embodiment is a pump that works in combination with a conveyor 66 that includes helical fins 68 that are affixed to the annular drive shaft 42. Therefore, the helical fins 68 are provided rotary movement from the drive element 54 for conveying dried organic waste toward the organic waste extractor 64. In one exemplary embodiment, the conveyor 66 includes a travel radius of about three inches and having a length of about 36 inches. A conveyor 66 having these dimensions would be run at a rate of about 30 rotations per minute. Further, the helical fins 68 include a generally uniform diameter, which is believed to prevent accumulation of organics or other organic wastes from concentrating irregularly upon the filter membrane 32. Rapid consistent movement of the water that passes through the first annular filter element 26 over the membranes 32 internal surface provided by the conveyor 66 fins 68 is thus achieved. However, in some applications it is desirable that the helical fines 68 are not of uniform diameter, but are frustoconical or angled at about 10 degrees, decreasing in diameter in a direction toward the second end 22 of the assembly 10. This is best represented in FIG. 7 in which the fins 68 include a wider diameter at the first end 18 of the assembly 10 than at the second end 22 of the assembly. It is believed this shape provide benefits to moving the increasingly viscous waste to the dried waste extractor.

Referring now to FIG. 4, the process by which organic waste is separated from a water will now be explained by way of a schematic representation. It should be understood that the process described herein is merely exemplary. The details associated with desalination of fracking fluids are for ease of understanding to one of ordinary skill in the art. It should be understood that the invention of the present application may be used to separate other organic wastes from waters, including, but not limited to desalination of ocean water, contaminated bio- and industrial fluids.

The helical fins 68 that are attached to the annular drive shaft 42 convey centrifugal force to the organic waste disposed in the inner housing chamber 13 when the annular drive shaft pivots around axis a forcing the water disposed in the organic waste radially outwardly of the housing 12. Should the annular drive be frustoconical in shape as described above, there will be a centrifugal force also conveyed parallel to the drive, from entrance to exit end, to facilitate direction of flow within the cylinder 70. Further, turbulent movement of the organic waste generated by rotation of the helical fins 68 prevents the filter membrane 32 from being blocked by sediment, precipitating organic waste or viscous supersaturated organic waste, thus providing for continuous operation of the assembly other than during self-cleaning backwash cycles. During the introduction of organic waste to the assembly 10 and while the annular drive shaft 42 is providing centrifugal force to the organic waste disposed in the inner housing chamber 13, the aperture drive mechanism 16 causes the piston 50 to compress the first and second annular filter elements 24, 26 thereby reducing the spacing between adjacent coils of the first annular coil 28 and the second annular coil 26 respectively. Reduced spacing provides filtration apertures of about 20 microns or less for filtering larger contamination disposed in the waste sludge while allowing the organic waste to pass through the second annular filter element 26, which is disposed radially inwardly of both the filter membrane 32 and the first annular filter element 24.

It should be understood that organic sludge disposed in the inner chamber 13 is rapidly rotated by the spinning helical or screw conveyor fins 68 that drive the water fluid filtrate radially outwardly through the first annular filter element 24, and when included, through the second annular filter element 26 and the filter membrane 32. After passing through the first annular filter element 24, the clean, purified water enters the clean water chamber 70 and exits through the outlet 72. In one embodiment, the variable filter apparatus (dewatering assembly) 24 is disposed at a slight angle of about 10° to allow drainage through the outlet 72. Alternatively, negative pressure or vacuum pressure is applied to the outlet 72 draw the clean, purified water from the clean water chamber 70. Dewatering is enhanced by introducing dry and/or heated air form the inside-out through the porous shaft 42 along with compression from the piston 50 and screw conveyor fins 68. The oxidizing inlet 63 includes a three way valve 61 that provides the ability to inject a combination of dry air and ozone to the organic waste inlet 62 with the ratios being modified to meet specific dewatering objectives. An optional hopper (not shown) is used to deliver organic waste to the organic waste pump 60.

The oxidizing agent and dry air are immediately introduced to the inwardly bound waste stream to allow the oxidizing agent to being reactive oxidation of the organics and for the air to begin drying the waste. The velocity of these fluids into the porous shaft 42 is adjustable to obtain target dryness values of the organic matter. It is believed that to process about twenty five tons per day of organic waste that the seven pounds per minute of waste must be introduced into a housing 12 that is about twelve inches diameter by thirty six inches high. Knowing the waste density, wetness, pacific heat of the water content beforehand along with a determination of the whether the temperature will be raised to the boiling point will provide the ability to calculate the evaporation time and cost. The amount of ozone or other oxidizing agent introduced to the process is dependent upon the level of sterility and deodorization is desired in the dried waste matter. Further, assemblies 10 may be connected in series or in parallel to achieved additional drying or increased throughput, respectively.

After passing through the second annular filter element 26 through the centrifugal force generated by the spinning helical fins 68, the water and microscopic particulate matter that passes through the second annular filter element 26 contacts the filter membrane 32 that is concentrically disposed between the first annular filter element 24 and the second annular filter element 26. Particulate matter having a diameter greater than about 20 microns does not reach the filter membrane 32 due to being entrapped by the second filter element 26. As explained in detail above, the zeolite 34 or graphene 39 or graphene-zeolite hybrid 41 or adsorbent 47 (FIG. 3) upon being applied as thin film, shown as zeolite (or alternate media noted) membrane 32 (FIG. 3) provides filtration providing porosities, optimally less than about 0.5 nanometers, which is capable of capturing microscopic organic waste and objectionable bacteria disposed in the organic waste while allowing the water to pass through. As would be anticipated by one of ordinary skill in the art, the particulate organic waste collects on the inner surface of the zeolite (or other such media noted) membrane 32 allowing clean water to pass through the membrane 32 radially outwardly through the first annular filter element 24 into the clean water chamber 70. The membrane 32 may also include adsorbent media having an affinity for dissolve waste solids extracted from the waste material. Such dissolve solids are eluted (desorbed) from the media, thus recycling the clarified or otherwise contaminated fluids. This step is equivalent to stripping sludge of the fluid contaminants, while restoring and recycling the extracted fluids using purification through the adsorbent, chelating, ion exchange and the like.

Water is removed from the clean water chamber 70 through water outlet 72. In the present example, clean fresh, useable water is extracted through the water outlet 72 that is not hazardous and can be easily disposed of or recycled without requiring additional treatment, remediation, or storage. When necessary, a vacuum or negative pressure is created by way of a pump (not shown) to draw the water out of the water chamber though the water outlet 72. It is contemplated by the inventor that vacuum or negative pressure of about 0.014 psi will suffice.

Figure 6:
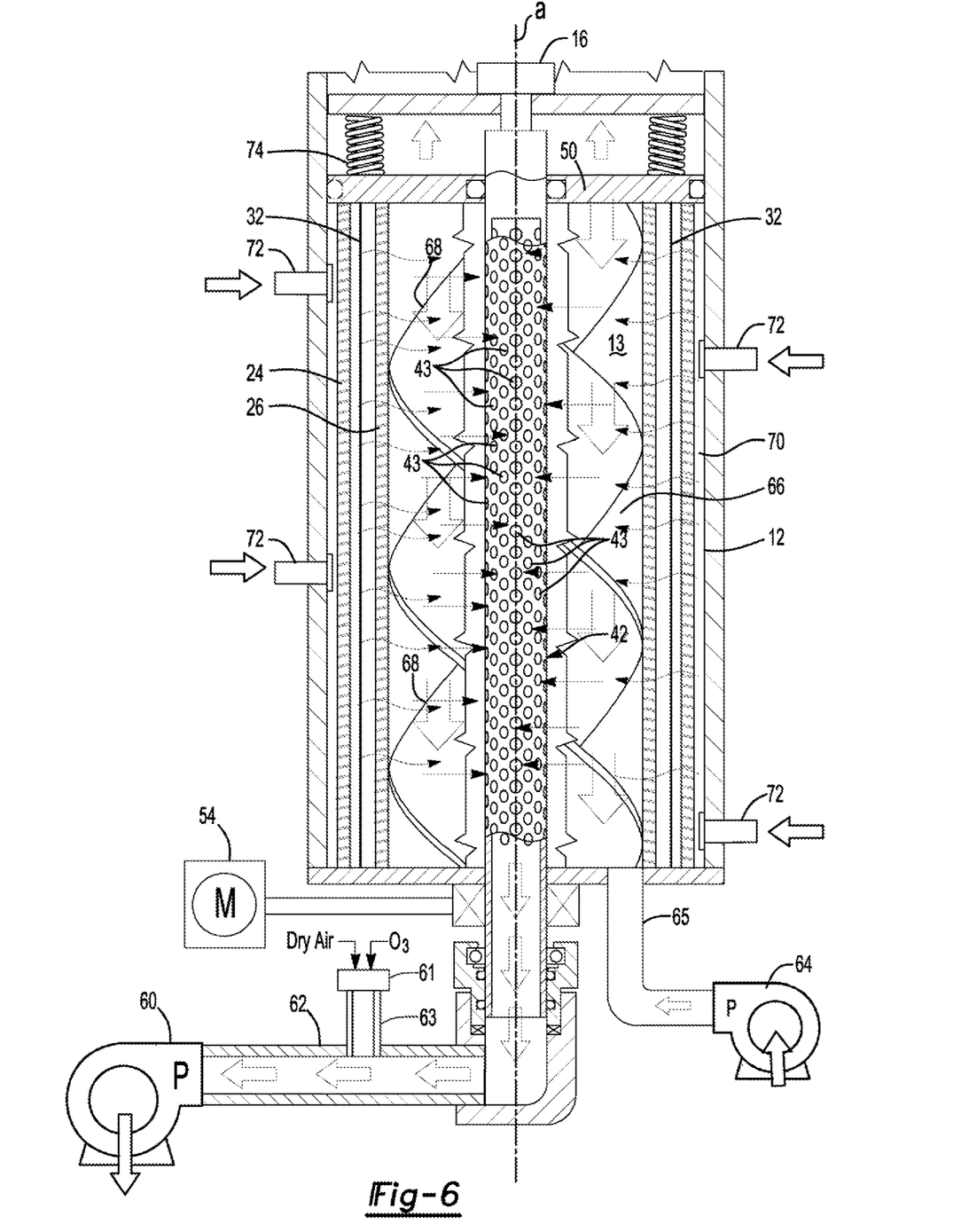
FIG. 6 shows a schematic view of the assembly representing backflush flow direction.

FIGS. 5 and 6 shows multiple water outlets 72 spaced along the housing 12. However, it should be understood that a single outlet 72 may also suffice for the purpose of extracting the water.

A desirable external pressure at the organic waste inlet 62, ranges between about 120 psi to about 150 psi. A desirable temperature at this pressure range is greater than about 120° F.

However, optimal pressure and temperature is determined based upon the amount of desired drying and type of organic waste being introduced to the assembly 10. Additional byproducts contained in the organic waste may be removed separately by automatic backwashing, as directed by a controller, such backwash will remove buildup of these byproducts from the second annular filter element 26 providing the ability for continuous processing of organic waste.

During extended operation, organic waste begins to collect in the inner housing chamber 13 and can substantially increase the weight percent and viscosity of the organic waste in the water disposed in the inner housing chamber 13. Therefore, the conveyor 66, while also creating centrifugal force to drive the solution radially outwardly and longitudinally, conveys the extracted organic matter downwardly in the inner housing chamber where the filtered organic matter is removed from the inner housing chamber 13 though the organic waste extractor 64 by way of the outlet 65. At this location, the organic matter is believed to include sludge-like consistency due to the high concentration of the filtered organic waste in the water. Should the viscosity exceed a level that disadvantages extraction of the organic waste from the inner chamber, an extraction pump at 65 provides negative pressure to the organic waste's exit 64, thereby facilitating removal of the filtered organic waste. Furthermore, the water content of the filter organic waste extracted through the organic waste extractor is controllable, depending upon particular needs of a given operation. Higher pressures or temperatures may be maintained in the assembly 10 causing evaporation of water contained in the organic waste. Further, the assembly 10 may be arranged in series to provide additional drying at even higher differential pressures and temperatures. Enhanced dewatering of the organic waste or filtrate is achieved under increased pressure on the order of about 125 psi by introducing pressurized air through the annular drive shaft 42, as noted in FIG. 1. The combination of pneumatic drying and pressure from the piston 50 and biasing element 74 are capable of sufficiently drying the organic waste, and provide organic matter dry enough to be economically subject to pyrolysis or as organic, sterile, odorless fertilizer product.

As set forth above, the organic waste collects on an inner surface of the filter membrane 32. When fluid pressure on the membrane 32 exceeds a predetermined limit, or at scheduled cycle times during extended operation, a controller (not shown), that is integrated with the assembly, initiates a backflush operation to reverse the flow of clean or purified water through the first annular filter element 24, the filter membrane 32, and subsequently through the second annular filter element 26 to remove buildup of organic matter, on, at least, the filter membrane 32 and the second annular filter element 26. The reverse flow process of the backflush operation is represented in FIG. 6.

During the backflush operations, the organics and solids waste pump 60 reverses direction to draw organic matter from the inner housing chamber 13. In addition, pressure is released on the first annular filter element 24 and the second annular filter element 26 to increase porosity from about 20 microns used for filtration to about 100 microns used for the backflush operation. A biasing element 74 maintains a desirable biasing force on the first annular filter element 24 and the second annular filter element 26 to maintain porosity in the 100 micron range during backflush operations. The piston 50 compresses the biasing element 74 during filtration and release the compression of the biasing element 74 while the assembly 10 is being backwashed. In addition, negative pressure is no longer maintained on the water outlet 72 during backflush operations so that the water may flow freely in the reverse direction through the filter membrane 32 by an amount believed to remove a buildup of organic matter on the filter membrane 32 and other larger contaminants entrapped by the second annular filter element 26.

The invention has been described is in an illustrative manner; many modifications and variations of the present invention are possible, including removal of toxins from fluids, in light of the above teachings. It is therefore to be understood that within the specification, the reference numerals are merely for convenience, and are not to be in any way limiting, and that the invention may be practiced otherwise than is specifically described. Therefore, the invention can be practiced otherwise than is specifically described within the scope of the stated claims following this first disclosed embodiment.

What is claimed is:

1. A centrifugal separation assembly, comprising:
a housing including an inner housing chamber and a filtrate chamber separated by a generally tubular permeable membrane;
a conveyor disposed within said inner housing chamber defined by said generally tubular membrane;
said conveyor including a pivotal shaft with helical fins disposed there along with said pivotal shaft providing rotational movement to said helical fins thereby centrifugally conveying solutes radially outwardly toward said generally tubular membrane while simultaneously forcing solids collecting inside said inner housing chamber in a direction of an axis defined by said pivotal shaft;
said pivotal shaft being hollow and defining a plurality of apertures, and a solute inlet being fluidly connected to said pivotal shaft thereby feeding solute into said inner housing chamber though said plurality of apertures; and
said permeable membrane defining molecular sized apertures for entrapping solids inside said inner housing chamber while allowing purified fluid to pass through to said filtrate chamber thereby reducing moisture content of the solids collecting inside said inner housing chamber.

2. The assembly set forth in claim 1, Wherein said tubular membrane is disposed radially outwardly of a first annular filter element defined by a first annular coil of a flat wire being generally helical in a direction of said axis defined by said tubular member.

3. The assembly set forth in claim 2, wherein said tubular membrane is disposed radially inwardly of a second annular filter element defined by a second annular coil of a flat wire being generally helical in a direction of said axis defined by said tubular member.

4. The assembly set forth in claim 1, Wherein said molecular sized apertures define a bacteria trapping configuration.

5. The assembly set forth in claim 1, wherein said generally tubular membrane defines a frustoconical shape.

6. The assembly set forth in claim 3, wherein said first annular filter element and said second annular filter element include a frustoconical shape internal to a centrifugal force generating screw conveyor.

7. The assembly set forth in claim 1, wherein said solute inlet includes an oxidizing inlet for feeding an oxidizing gas into said solute inlet for oxidizing the solute being fed to said inner housing chamber.

8. The assembly set forth in claim 3, wherein said first annular filter element and said second annular filter element each define adjacent coil spacing being adjustable by a compressive piston.

9. The assembly set forth in claim 1, wherein the solute comprises organic waste and a solvent comprises water that is purified of bacteria by the permeable membrane.

* * * * *